PRIOR ART

United States Patent Office 3,486,820
Patented Dec. 30, 1969

3,486,820
PHOTOGRAMMETRIC PROJECTION INSTRUMENT
Theodore J. Blachut, Gerhardus H. Schut, and Antoni
J. Smialowski, Ottawa, Ontario, Canada, assignors to
Canadian Patents and Development Limited, Ottawa,
Ontario, Canada, a company of Canada
Filed Jan. 15, 1968, Ser. No. 697,776
Int. Cl. G03b 27/32, 35/14
U.S. Cl. 355—22
19 Claims

ABSTRACT OF THE DISCLOSURE

Two projects illuminate sequentially corresponding partial areas of a stereo-pair of aerial photographs, a mirror being associated with each of these projectors, and at least one of these mirrors being a partial-transparent mirror that divides the beam of light emanating from its associated projector into a transmitted and a reflected beam. The transmitted beam is directed to a recording surface for the production of an orthomap, while the reflected beams are directed to respective viewing systems. As the two photographs are scanned by the respective beams of light, the mirrors are rotated appropriately to maintain the reflected beams directed to eyepieces provided in the viewing systems. Simultaneously, a Dove-prism included in each viewing system is rotated about the optical axis of the respective viewing system so that the images of each partial area observed through eyepieces provided in the viewing systems appear always in an upright position independently of the directions along which the beams of light emanate from the projectors in order to form a virtual, optical stereoscopic model of the terrain details in the photographs. The viewing systems may each be provided with a measuring mark. The two marks together form a stereoscopic image that the operator can cause to appear to coincide with a point of the optical model by shifting the recording surface towards or away from the projectors.

---

This invention relates to a photogrammetric projection instrument as used for producing an orthomap from a stereo-pair of photographs.

The term "stereo-pair" is herein used to designate two photographs of the same object taken from different points so as to be able to create a stereoscopic optical model of the object. The photographed object will normally be a terrain, and the two stereo-photographs will normally be taken sequentially from an aeroplane. The orthomap, in which all horizontal distances are reduced to the same scale independently of variations in elevation of terrain details, may be a true map produced by manually plotting a chart or may be an orthophotograph obtained by exposing a photosensitive film.

Some prior art apparatus for producing such orthomap contain two projection assemblies in which two diapositives of the aerial photographs are so placed that a real, optical, stereoscopic model of the portion of terrain common to both photographs is created at the area of intersection of beams emanating from the two projection assemblies. Partial areas small in comparison with the total area of the diapositives are sequentially reproduced on a recording surface which during operation is shifted perpendicularly to its own plane to ensure that the portion of the recording surface under consideration always intersects the stereoscopic model. In order to visualize the optical model stereoscopically, red and green filters are required in front of the projection assemblies and correspondingly coloured glasses must be provided for the observer. As a result, colour photographs cannot be used and, more importantly, no orthophotographs in colour can be made.

During production of the orthomap the operator must always observe the small partial area of the recording surface under consideration, which area may be defined by a mask with an aperture therein. This mask is caused to scan the recording surface, with the result that its distance from the operator's eyes will vary continuously, thereby not only fatiguing the operator but also causing variations in accuracy. Furthermore, since the scanning of the mask takes place in the scale of the real stereoscopic model, the scanning speed will be limited to a relatively low value, even if the terrain represented by the model were sufficiently uniform to permit a significantly higher speed.

In the preferred form of the present invention these limitations and disadvantages are overcome by means of a pair of viewing systems each having an eyepiece fixed to a framework of the instrument. The beam of light emanating from one of the projection assemblies is divided by a partial-transparent mirror, the transmitted portion of the beam being directed to the recording surface and the reflected portion of the beam being directed to one of the eyepieces. The beam of light emanating from the other one of the projection assemblies is directed by a mirror to the other eyepiece. As a result, a virtual, optical, stereoscopic model of the common terrain depicted in the diapositives can be observed through the eyepieces. As the recording surface is scanned along a so-called Y-direction, the mirrors are rotated to maintain the respective beams of light always directed to the eyepieces. The viewing systems are each provided with a Dove-prism which, as the recording surface is scanned in an X-direction perpendicular to the Y-direction, rotates about an axis perpendicular to the rotation axis of the mirrors to maintain the optical model visible in the eyepieces always in an upright orientation.

The invention may thus be defined as consisting of a photogrammetric projection instrument comprising (a) A first and a second projection assembly for projecting a stereo-pair of photographs of an object, and a framework for supporting said first and second projection assemblies side-by-side.

(b) A recording assembly having a recording surface, and means for shifting said recording surface in the direction towards said projection assemblies;

(c) Means for generating an optical stereoscopic model of said object, comprising a first viewing system mounted on said framework and associated with said first projection assembly and a second viewing system mounted on said framework and associated with said second projection assembly;

(d) A partial-transparent mirror disposed in the beam of light emanating from said first projection assembly, and first means coupled to said shifting means for orienting said partial-transparent mirror to direct a transmitted beam to said recording surface and a first reflected beam to said first viewing system; and (e) A further mirror disposed in the beam of light emanating from said second projection assembly, and second means coupled to said shifting means for orienting said further mirror to direct a second reflected beam to said second viewing system to form with said first reflected beam said optical model.

There may also be provided in each viewing system a measuring mark arranged so that the two measuring marks produce a stereoscopic image in the eyepieces, it being possible to vary the apparent distance between this measuring mark image and any selected surface of the virtual stereoscopic model by shifting the recording surface perpendicular to its plane.

According to another feature of the present invention, the recording surface may be placed at a location closer to the projection assemblies than would be possible in prior art apparatus, thereby allowing the production of a smaller scale orthomap.

Figure 1:
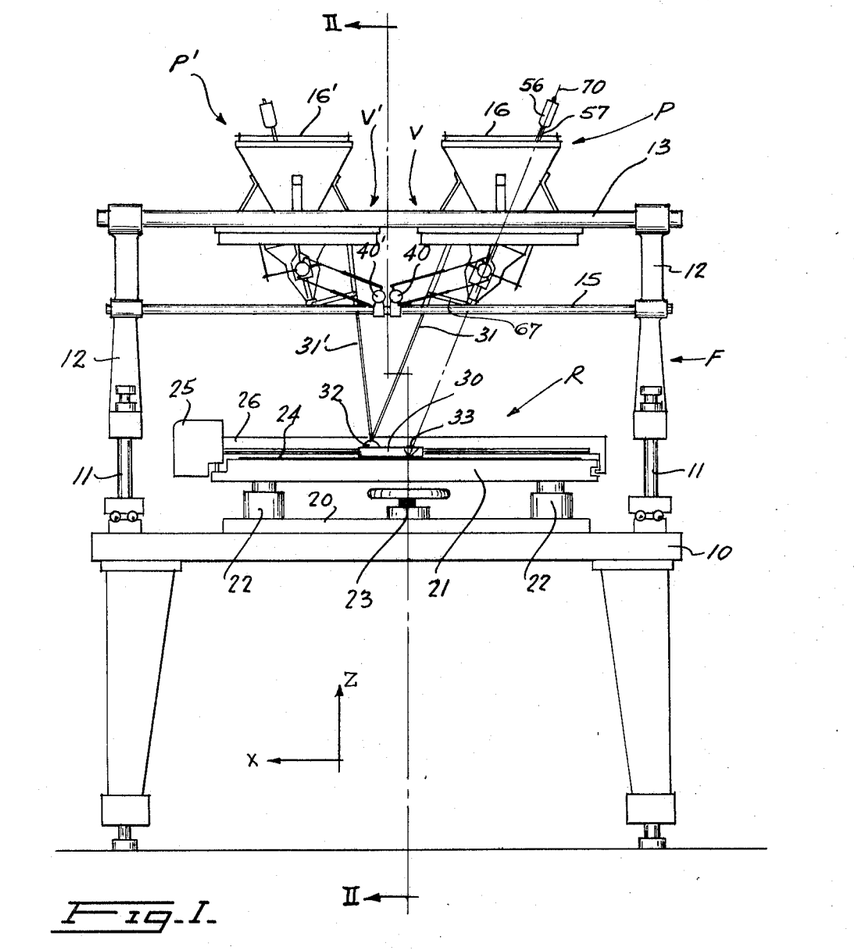
FIG. 1 is a front view of a photogrammetric projection instrument according to the present invention.
Figure 2:
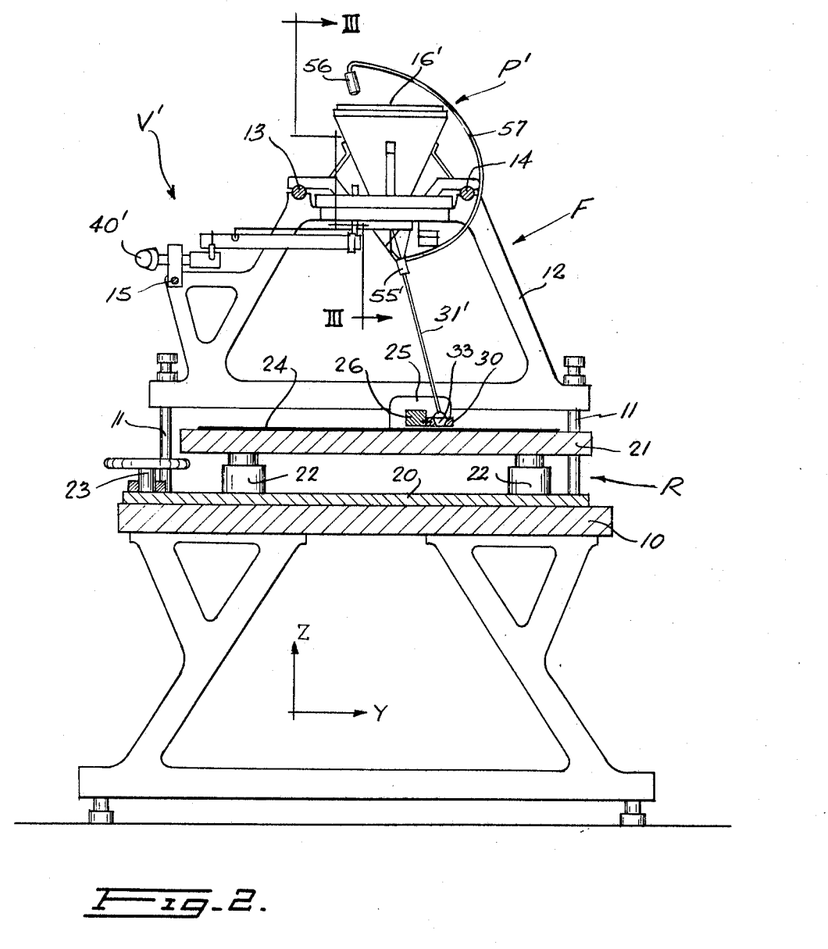
FIGURE 2 is a cross-section taken along the line II—II in FIGURE 1.

The present invention will become apparent in more detail from the following disclosure of examples of the invention described with reference to the accompanying drawings:

FIGURE 5 is a top plan view of the portion shown in FIGURE 4 with certain parts including the projection assembly removed and with the elements in somewhat different positions;

GENERAL STRUCTURE (FIGURES 1 AND 2)

The overall arrangement comprises a table 10 supporting a framework F and a recording assembly R. The framework F is mounted on the table 10 by means of four adjustable legs 11 and consists essentially of two upright side pieces 12 and three bars 13, 14 and 15 extending horizontally between the two sidepieces 12 in a direction which will hereinafter be referred to as the X-direction. The bars 13 and 14 are arranged in the same horizontal plane and spaced apart in a direction which will hereinafter be referred to as the Y-direction.

Two projection assemblies P and P' are slidably supported on the bars 13 and 14. The projection assembly P holds a diapositive 16, and the projection assembly P' holds a diapositive 16'. The two diapositives 16 and 16' together form a stereo-pair of photographs. As to their structure, the two projection assemblies P and P' are composed of the same elements, some of which, however, are symmetrical about the plane in which FIGURE 2 is taken.

The recording assembly R consists of a base plate 20 resting on the table 10, and a mounting plate 21 supported on the base plate 20 by means of four telescopic legs 22. A hand wheel 23 is connected to the telescopic legs 22 by suitable conventional mechanical or hydraulic means (not shown) so that upon rotation of the hand wheel 23 the mounting plate 21 will be shifted in an upward or downward direction depending on the sense of rotation. The direction along which the mounting plate 21 is shifted is perpendicular to the X- and to the Y-directions and will hereinafter be referred to as the Z-direction.

The mounting plate 21 supports a recording surface 24 on which the map is produced. A motor and drive unit 25 is rigidly connected to a bar 26 spaced from and extending across the recording surface 24 along the X-direction. The motor and drive unit 25 and the bar 26 are together slidably mounted on the plate 21 for movement in the Y-direction.

A mask plate 30 engages the bar 26 in such a manner as to be movable along such bar and hence movable across the recording surface 24 in the X-direction. Two space rods 31 and 31' connected to the projection assemblies P and P' respectively are coupled to the mask plate 30 by a common ball type universal joint 32. The mask plate 30 is provided with an aperture 33 through which a small area of the recording surface 24 is exposed to a beam of light emanating from the projection assembly P.

Attached to the horizontal bar 15 of the framework F is a pair of binocular eyepieces 40, 40', each of which forms part of a viewing system V, V' associated with the respective one of the projection assemblies P, P'. Similarly to the projection assemblies, the viewing systems include essentially identical elements and are arranged symmetrically about the plane in which FIGURE 2 is taken. For this reason in the following detailed description only one of the viewing systems and its associated projection assembly are considered.

Figure 3:
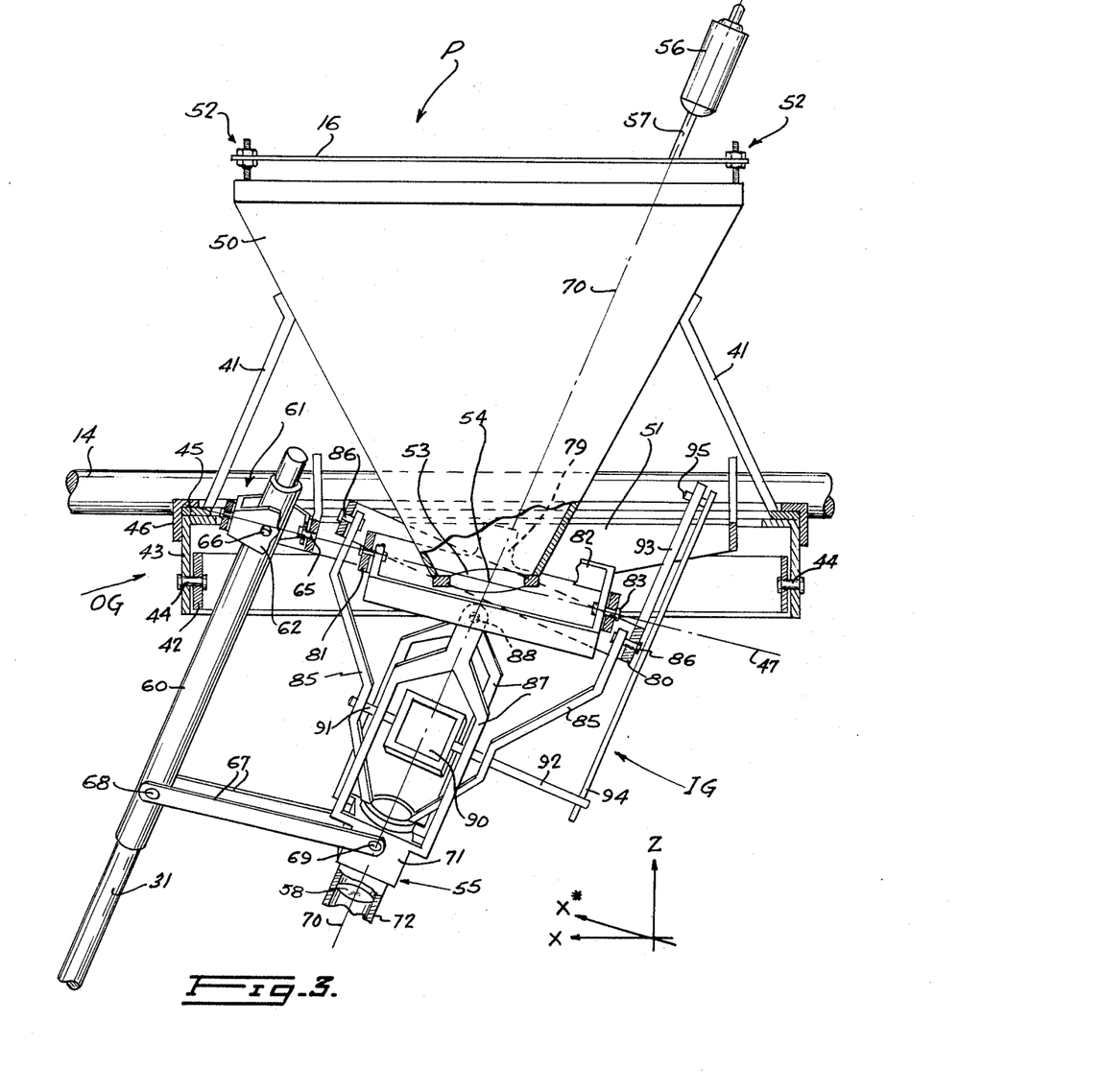
FIGURE 3 is a partial front view taken along the line III—III of FIGURE 2 with parts broken away.
Figure 4:
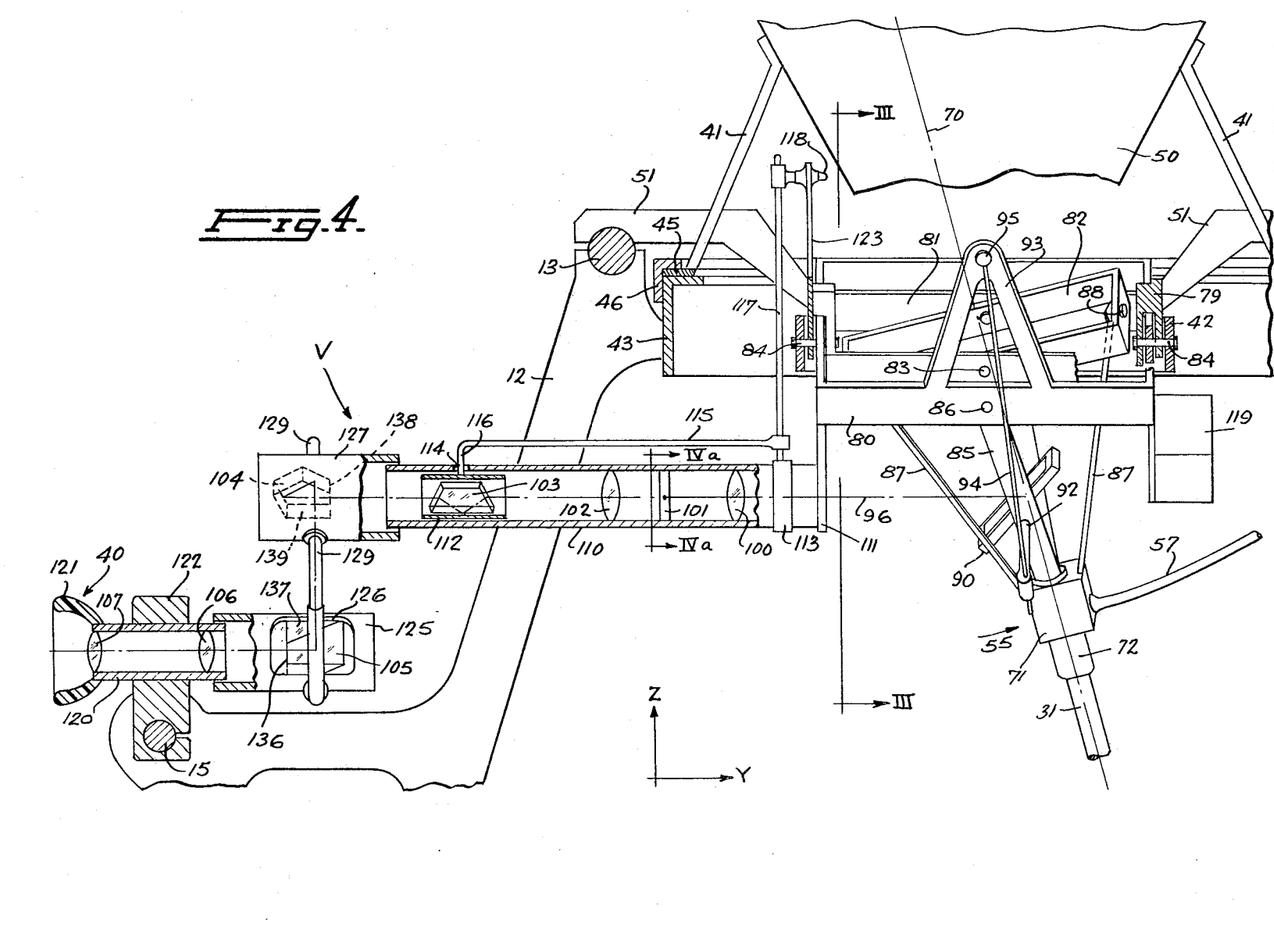
FIGURE 4 is a cross-section showing a portion of FIG-URE 2 on an enlarged scale and with parts broken away.

PROJECTION ASSEMBLIES AND SPACE ROD ARRANGEMENT (FIGURES 3 TO 5)

Part of the framework F, the projection assembly P and the viewing system V are shown. In FIGURES 3 and 4 the device has been assumed to be in a position similar to that shown in FIGURES 1 and 2 where the mask plate 30 is at such location that the space rod 31 is inclined with respect to the Z-direction. In the top view of FIG-URE 5, however, from which the projection assembly has been removed, the device is assumed to be in a position in which the space rod 31 extends in the Z-direction, i.e., in a direction perpendicular to the plane in which FIG-URE 5 is taken.

According to FIGURES 3 to 5 the projection assembly P comprises a hollow truncated inverted pyramidal projector 50 carrying at its lower end a projection lens 53 having a nodal point 54. The pyramid 50 is mounted by several support arms 41 on an outer gimbal system OG connected to a support 51 slidably suspended from the bars 13 and 14. The outer gimbal system OG comprises a first gimbal ring 42 connected to the support 51 by two pins 84 for rotation about an axis parallel to the Y-direction and passing through the nodal point 54. A second gimbal ring 43 is connected to the first gimbal ring 42 by two pins 44 for rotation about an axis perpendicular to the Y-direction and also passing through the nodal point 54. The support arms 41 are provided at their lower ends with a ring 45 which is held on the second gimbal ring 43 by a mounting ring 46 for rotation about a third axis perpendicular to both the axes of rotation of the first and second gimbal rings 42, 43 and again passing through the nodal point 54. Suitable worm drives (not shown) of conventional construction are provided to carry out adjustment rotations of the projector 50 within a range of up to about 5° about each of these three axes, and to lock the outer gimbal system OG in this adjusted position.

Thus, the outer gimbal system OG permits adjustment of the projector 50 about three axes perpendicular to each other to compensate for changes in the flying direction or in the angles of the aeroplane with respect to the terrain, which changes may have occurred between taking the first and the second diapositive. Since the outer gimbal system OG is so arranged that all three axes intersect at the nodal point 54 of the projection lens 53, the location of the nodal point 54 is fixed with respect to the support 51.

The diapositive 16 is mounted on top of the projector 50 by means of four screw and nut arrangements 52 provided at each corner thereof to vary the distance between the diapositive 16 and the projection lens 53 and, thereby, to correct slight differences that may exist between the focal length of the projection lens 53 and that of the lens of the diapositive 16 was taken.

A focussing device 55 containing a focussing lens 58 is connected to the support 51 by means of an inner gimbal system IG so as to be universally rotatable about the nodal point 54 of the projection lens 53. A projection lamp 56 illuminating a partial area of the diapositive 16 from its topside is connected to the focussing device 55 by means of a rigid loop 57 which is shown in its full shape in FIGURE 2.

The space rod 31 is slidably mounted in a sleeve 60 which in turn is articulated at its upper end to the support 51 by means of a universal coupling 61. The universal coupling 61 comprises a frame 63 attached to the support 51 and a ring 62 connected to the frame 63 by two pins 65 defining an axis of rotation 47 including the nodal point 54 and extending in a direction which is perpendicular to the Y-direction and inclined to the X-direction, and which will hereinafter be referred to as the X*-direction. The sleeve 60 is suspended within the ring 62 by two further pins 66 defining a second axis of rotation perpendicular to the X*-direction. As a result, the sleeve 60 and, therefore, the space rod 31 are universally rotatable about the intersection point of the two axes defined by the pins 65 and 66. Two links 67 are each connected at one end to the lower part of the sleeve 60 by a pair of pins 68 and at their other end to the focussing device 55 by a pair of pins 69.

With reference to FIGURES 1 and 3, the geometry of the system is as follows. The line connecting the intersection point of the two space rods 31 and 31' to the center of the aperture 33 in the plane of the recording surface 24, the links 67 and the line connecting the nodal point 54 of the projection lens 53 to the intersection point of the two axes defined by the pins 65 and 66, are parallel to each other and extend in the X*-direction. Normally, the universal joint 32 will be so arranged on the mask plate 30 that the point of intersection of the space rods 31 and 31' is situated above the plane of the recording surface 24 and it is this fact that dictates the inclination of the X*-direction to the X-direction. Furthermore, the loop 57 is so shaped that the center of the projection lamp 56, the nodal point 54, the optical center of the focussing lens 58 and the center of the aperture 33 are disposed along a common straight line 70 which represents the axis of the projection beam and is parallel to the space rod 31.

INNER GIMBAL SYSTEM (FIGURES 3 TO 5)

Each inner gimbal system IG comprises an outer gimbal ring 80, a middle gimbal ring 81, and an inner gimbal ring 82. The middle gimbal ring 81 is rigidly connected to the support 51 by two brackets 79 with two parallel sides extending in the Y-direction and the other two parallel sides extending in the X*-direction. The inner gimbal ring 82 is articulated to the middle gimbal ring 81 by two pins 83 defining an axis of rotation coincident with the axis 47. The outer gimbal ring 80 is articulated to the middle gimbal ring 81 and the support 51 by the pins 84, which, as mentioned above, define an axis of rotation parallel to the Y-direction. The two axes defined by the pins 83 and 84, respectively, intersect each other at the nodal point 54 of the projection lens 53.

The focussing device 55 includes an outer casing 71 and an inner tube 72 housing the focussing lens 58 and mounted within the outer casing 71 for rotation about the optical axis of the focussing lens 58 which coincides with the straight line 70 representing the projection beam. The focussing device 55 is suspended from the inner gimbal system IG by means of two arms 85 rigidly connected at their lower ends to the tube 72 and articulated at their upper ends to the outer gimbal ring 80 by two pins 86, so as to be rotatable about an axis perpendicular to the Y-direction, as well as by means of two arms 87 rigidly connected at their lower ends to the casing 71 and articulated at their upper ends to the inner gimbal ring 82 by a pair of pins 88, so as to be rotatable about an axis perpendicular to the X*-direction. As a result, the focussing lens 58 is universally rotatable about the nodal point 54 of the focussing lens 53.

A partial-transparent mirror 90 is so suspended within the inner gimbal system IG by two rods 91 and 92 having a common axis parallel to the axis of the pins 86, that the center of the mirror 90 is always intersected by the axis 70 of the projection beam. The rod 91 is pivotally mounted in a center portion of one of the arms 85, and the rod 92 is pivotally mounted in the center portion of the other arm 85. The outer gimbal ring 80 is provided at one of its sides extending along the Y-direction with an upwardly projecting yoke 93. A connecting rod 94 is fixed at its upper end to a pin 95 pivoted to the yoke 93 and is slidably mounted at its lower end in the end of the rod 92. So long as the inner gimbal system IG is so oriented that the axis 70 lies in a plane defined by the X- and Z-directions, the distance between the axis of the rod 92 and that of the pin 95 is twice the distance between the axis of the pin 95 and that defined by the pins 86. As the mask 30 is moved along the Y-direction, thereby tilting the axis 70 to the X- Z-plane, the distance between the rod 92 and the pin 95 changes and it is for this reason that the connecting rod 94 is slidably mounted in the rod 92, although of course it could alternatively be slidable within the pin 95. With this geometry, as the mask 30 is moved along the Y-direction, the partial-transparent mirror 90 will rotate about its own axis defined by the pins 91 and 92 at an angular speed that is half the angular speed of its rotation about the axis defined by the pins 86.

Figures 6, 6A:
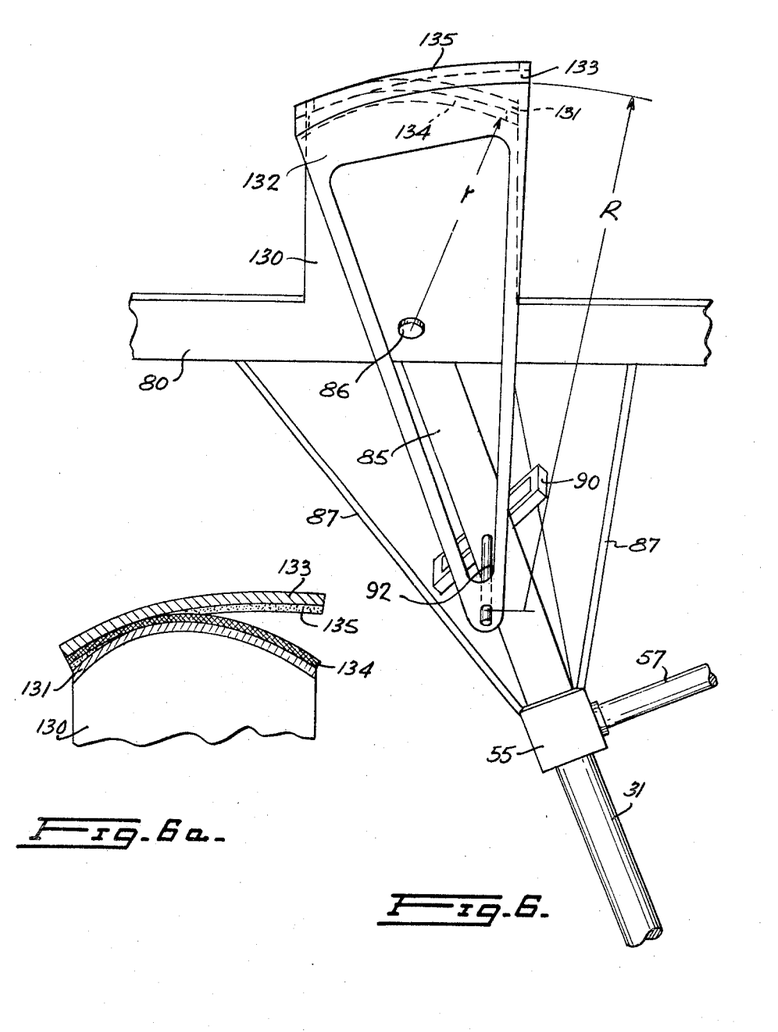
FIGURE 6 shows another embodiment of a part of an instrument according to the present invention in a view similar to FIGURE 4.
FIGURE 6a is a fragment of the instrument of FIG-URE 6 taken in a parallel plane.

ALTERNATIVE GIMBAL SYSTEMS (FIGURES 6, 6a)

A different embodiment of a mechanism for rotating the partial transparent mirror 90 about the axis of the rods 91, 92 at half its rotational speed about the axis defined by the pins 86, is shown in FIGURES 6 and 6a. An upright extension 130 of the outer gimbal ring 80 is provided at its upper end with a circularly convex flange 131, the axis defined by the pins 86 being the center of the curvature of such flange. An arm 132 is fixed to the rod 92 and is provided at its upper end with a circularly concave flange 133 curved about the axis of the rod 92. The flange 133 rides on the flange 131 and is connected thereto by means of two flexible bands 134 and 135 disposed side-by-side. As can be seen more clearly from the cross-section in FIGURE 6a, the outer band 134 is fixed at its left end to the flange 133 and at its right end to the flange 131, whereas the inner band 135 is fixed at its left end to the flange 131 and at its right end to the flange 133.

MIRROR OPERATION

The partial-transparent mirror 90 is fixed to the rods 91 and 92 so that its center point lies on the axis of the rods and its plane forms an angle with the Y- and Z-directions, which angle is 45° when the mask 30 is in a position in which the space rod 31 is parallel to the Z-direction. As a result, the partial-transparent mirror 90 divides the beam emanating from the projection lamp 56 and passing through the diapositive 16 and the projection lens 53, into a transmitted part which follows the line 70 and a reflected part which travels away from the mirror 90 always in a direction parallel to the Y-direction, independently of the inclination of the inner gimbal system IG, as indicated by the dash and dot line 96 in FIGURE 4.

By selection of the density of the reflecting layer of the partial-transparent mirror 90 it is possible to obtain any required ratio between the transmitted portion of the beam used for exposing the recording surface and the reflected portion of the beam directed to the viewing system.

Since the map to be produced on the recording surface 24 is made from only one diapositive, e.g., from the diapositive 16, only the beam of light emanating from the projection assembly P is divided by a partial-transparent mirror. The mirror associated with the other projection assembly P' is a full mirror, and accordingly, the part in the second assembly corresponding to the focussing device 55 is replaced by a simple mechanical member having the same physical dimensions as the focussing device 55 but not containing a focussing lens. To compensate for the fact that the full mirror will reflect more light than the partial-transparent mirror the projection lamp 56' may be reduced in intensity compared to the lamp 56.

Figure 4A:
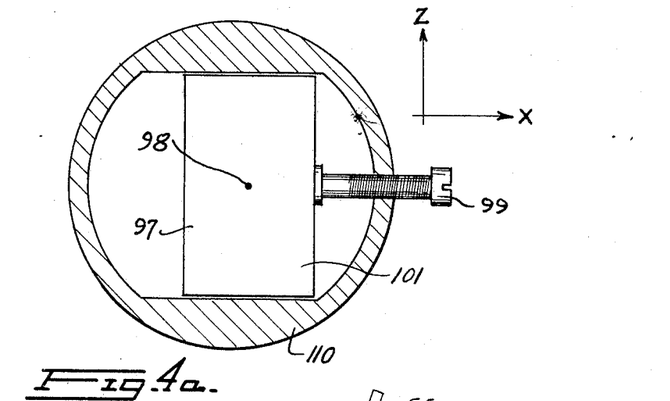
FIGURE 4a is a section on the line IVa—IVa in FIG-URE 4.

VIEWING SYSTEMS (FIGURES 4, 4a AND 5)

The reflected part of the beam of light passes through the viewing system V and reaches the eyepiece 40. The viewing system V comprises the following optical elements, enumerated in the order in which they are encounted by the beam of light: a first lens 100; a measuring mark 101, such as a glass plate 97 with a dot 98 on it (FIGURE 4a); a second lens 102; a Dove-prism 103; a pentagon prism 104; a triangular prism 105; a third lens 106; and an ocular lens 107. The first and second lenses 100 and 102, the measuring mark 101 and the Dove-prism 103 are mounted in a tube 110 which extends in a direction parallel to the Y-direction, is attached at one end to a depending extension 111 provided at the front side of the outer gimbal ring 80 and rotates with the latter about the axis defined by the pins 84.

The Dove-prism 103 is contained in a tubular member 112 rotatably mounted within the tube 110 about the axis of the tube, which axis coincides with the optical axis of the lenses 100 and 102. The tubular member 112 is connected to a bent-down portion 116 of a rod 115, which passes through a circumferentially elongated window 114 in the tube 110. An essentially vertically extending connecting rod 117 is fixed at its lower end to a guide sleeve 113 rotatable about the tube 110 and at its upper end to a pin 118 pivoted on an upright extension 123 provided at the front side of the support 51. The distance between the axis of the pin 118 and the axis of the tube 110 is double the distance between the axis defined by the pins 84 and the axis of the tube 110, so long as the axis 70 lies in a plane defined by the Y- and Z-directions. The distance between the pin 118 and the axis of the tube 110 will change as the mask 30 travel along the X-direction, and, therefore, the connection rod 117 slidably engages the pin 118. As a result, as the mask 30 moves along the Y-direction, the Dove-prism 103 is rotated about its own optical axis at an angular speed which is half the angular speed of the tube 110 about the axis defined by the pins 84. Again, the described mechanism for rotating the Dove-prism can be replaced by a mechanism as shown in FIGURES 6 and 6a. The Dove-prism 103 serves to rotate rotate the image transmitted to the eyepiece 40 in its own plane and is so adjusted within the tube 110 that, when the mask 30 is in a position in which the space rod 31 extends along the Z-direction, the Dove-prism 103 is in its upright position.

As the rear side of the outer gimbal ring 80 opposite to the depending extension 111 there is provided a counterweight 119 for balancing the weight of that portion of the viewing system V which is suspended on the outer gimbal ring 80.

The third lens 106 and the ocular lens 107 are disposed within a tubular portion 120 which may be provided at its front end with a rubber protector 121 and which is slidably supported on the bar 15 of the framework F by a clamp 122. By shifting one clamp 122 associated with each of the viewing systems V, V', the distance between the two eyepieces 40 and 40' may be adapted to the distance between the eyes of the operator.

Rotatably mounted on the tubular portion 120 is a cylinder 125 having a window 126 in its circumferential surface. The triangular prism 105 has two surfaces 136, 137 perpendicular to each other and is so disposed within the cylinder 125 that the surface 136 faces the third lens 106 and the surface 137 faces the window 126. Similarly, a cylinder 127 is rotatably mounted on the tube 110 and has a window 128 (FIGURE 5) in its circumferential surface. The pentagon prism 104 also has two surfaces 138, 139, perpendicular to each other and is so disposed within the cylinder 127 that the surface 138 faces the Dove-prism 103 while the surface 139 faces the window 128.

The two cylinders 125 and 127 are interconnected by means of two telescopic rods 129 so that the windows 126 and 128 always face each other, and the two prism surfaces 137 and 139 are maintained parallel.

Figure 7:
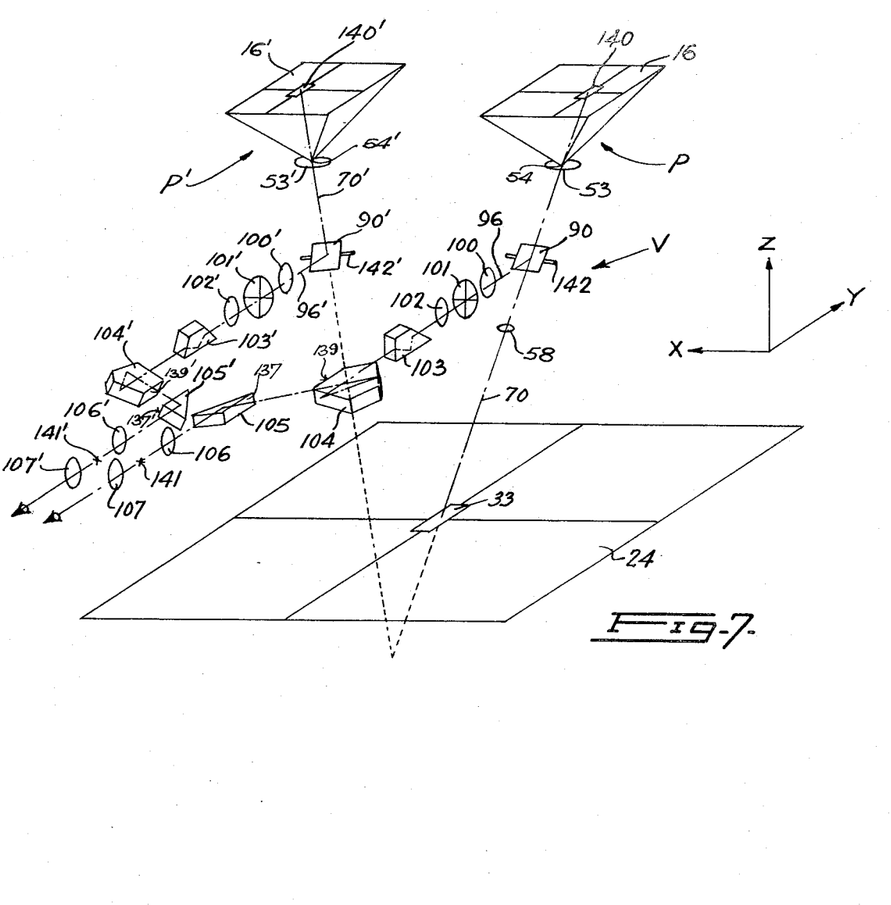
FIGURE 7 is a diagrammatical view illustrating the working principle of the optical elements of instruments according to the invention.

GEOMETRY OF THE OPTICAL ELEMENTS (FIGURE 7)

As shown in the merely diagrammatical view of FIGURE 7, the two diapositives 16, 16" associated with the respective projection assemblies P, P' are disposed in a common plane substantially parallel to the plane of the recording surface 24 and perpendicular to the Z-direction. A partial area 140 only small in comparison with the total area of the diapositive 16 is projected onto a corresponding area of the recording surface 24 as defined by the aperture 33. The focus of the projection lens 53 lies substantially in the plane of the diapositive 16, so that the projection beam emanates from the lens 53 as a bundle of parallel rays. The part of the projection beam transmitted through the partial-transparent mirror 90 along the axis 70 passes through the focussing lens 58 where the incoming parallel rays are focussed to the plane of the recording surface 24.

The measuring mark 101 is disposed at the focal point of the first lens 100 as well as at the focal point of the second lens 102. A negative lens (not shown) may be provided in the plane of the measuring mark 101 to increase the field of view. The part of the projection beam reflected by the partial-transparent mirror 90 as a bundle of rays parallel to the line 96 is focussed by the first lens 100 at the measuring mark 101 and leaves the second lens 102 again as a bundle of parallel rays. It is important that the beam between the second lens 102 and the third lens 106 consist of parallel rays, because only under these circumstances will a distortionless picture be produced in the focal plane of the third lens 106 independently of the angular position of the Dove-prism 103 and of the distance between the pentagon prism 104 and the triangular prism 105. The focal point of the third lens 106 is indicated in FIGURE 7 at 141 where the image of the respective partial area 140 is produced. This image is viewed through the ocular lens 107.

In order to obtain on the recording surface 24 a non-reversed map, the two diapositives 16 and 16' are so placed in the projection assemblies P and P' respectively, that they appear non-reversed when viewed from above. By means of the viewing systems V, V', however, the diapositives 16, 16' are viewed from below, and to obtain non-reversed images at the points 141, 141', one of the prisms 104, 105 in the viewing system V (and similarly one of the prisms 104', 105' in the viewing system V') is a pentagon prism and the other a triangular prism. With reference to FIGURE 4, it would also be possible to provide the triangular prism 105 in the cylinder 127 and the pentagon 104 in the cylinder 125.

As the aperture 33 is moved across the recording surface 24 along the Y-direction, the partial-transparent mirror 90 and the focussing lens 58 associated with the projection assembly P together rotate about an axis perpendicular to the Y-direction and passing through the nodal point 54 of the projection lens 53. Similarly and at the same angular speed, the full mirror 90' rotates about an axis perpendicular to the Y-direction and passing through the nodal point 54' of the projection lens 53'. Simultaneously, the partial-transparent mirror 90 rotates about its axis 142 and the full mirror 90' rotates about its axis 142', both at an angular speed that is half the angular speed of the rotation about the nodal points 54, 54'.

As the aperture 33 moves across the recording surface 24 along the X-direction, the partial-transparent mirror 90, the focussing device 55, the first lens 100, the measuring mask 101, the second lens 102, the Dove-prism 103 and the pentagon prism 104 together rotate about an axis parallel to the Y-direction and passing through the nodal point 54 of the projection lens 53. Simultaneously, the Dove-prism 103 rotates about its axis aligned with the optical axis defined by the straight line 96 at an angular speed that is half the angular speed of the rotation of the tube 110 about the nodal point 54. Also simultaneously, the distance between the pentagon prism 104 and the triangular prism 105 changes; the pentagon prism 104 rotates about its axis aligned with the straight line 96 and the triangular prism 105 rotates about the optical axis of the third lens 106, both at the same angular speed and in the same sense, so that their two surfaces 139, 137 facing each other always remain parallel. Similarly, the full mirror 90', the first lens 100', the measuring mark 101', the second lens 102', the Dove-prism 103', and the pentagon prism 104', together rotate about an axis parallel to the Y-axis and passing through the nodal point 54' of the projection lens 53'. Simultaneously, the Dove-prism 103' rotates about its axis aligned with the straight line 96' at an angular speed that is half the angular speed of rotation about the nodal point 54' of the projection lens 53'. Also simultaneously, the distance between the pentagon prism 104' and the triangular prism 105' changes; the pentagon prism 104' rotates about its axis aligned with the straight line 96' and the triangular prism 105' rotates about the optical axis of the third lens 106', both at the same angular speed and in the same sense so that their two surfaces 139', 137' facing each other always remain parallel.

As stated above, the projection beam leaves the projection lens 53 as a bundle of parallel rays. The function of the focussing lens 58 is to focus the portion of this bundle that is transmitted by the partial-transparent mirror 90 onto the recording surface 24. Since the distance of the recording surface 24 from the focussing lens 58 varies as the aperture 33 scans the recording surface and also when the recording surface is shifted along the Z-direction there will be many conditions in which, with a fixed position of the focussing lens, no accurately focussed image is produced. While a measure of focussing inaccuracy of the projection beam at the recording surface can normally be tolerated, it is also possible to control the position of the focussing lens 58 within the tube 72 (see FIGURE 3) so as to maintain its focal point at the recording surface 24, such control being performed by an additional link (not shown) below the space rod 31 and the focussing lens.

Figure 8:
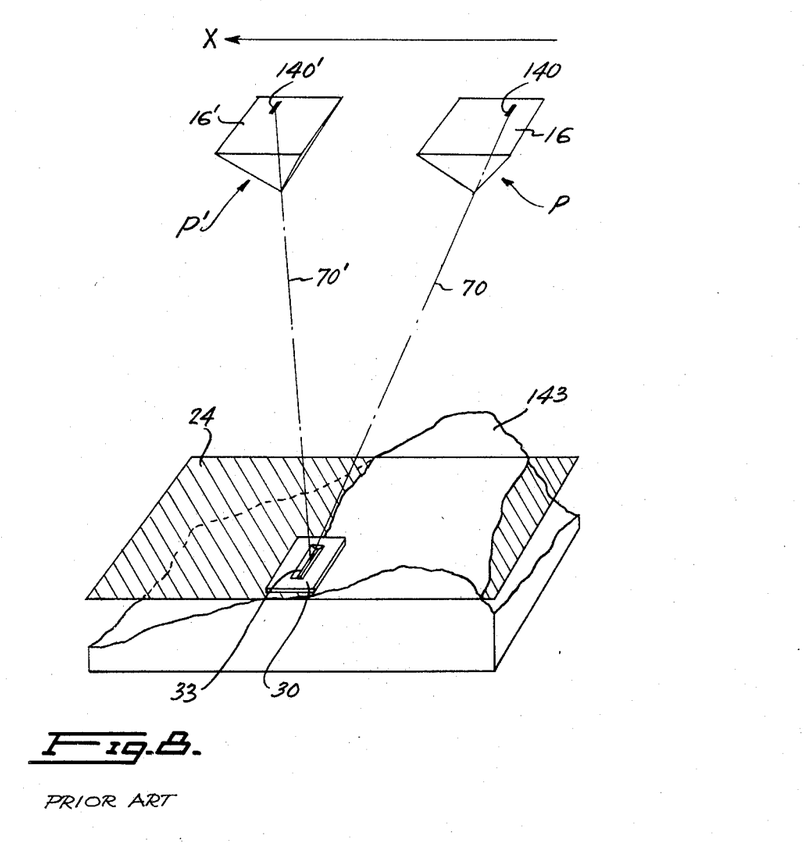
FIGURE 8 is a diagrammatical view illustrating the working of a prior art photogrammetric apparatus.

OPERATION (FIGURES 4a, 7 AND 8)

FIGURE 8 diagrammatically shows the two projection assemblies P and P' each provided with a diapositive 16 and 16' respectively. The two diapositives form together a stereo-pair of photographs which normally have been taken sequentially from an aeroplane and contain the representation of a terrain. The X-direction along which the two projection assemblies P and P' are arranged side-by-side corresponds to the flight direction of the aeroplane as it appears in the representation in the diapositives 16 and 16'. Deviations from the flying direction or changes in the angle of the photographing camera relative to the terrain which may have occurred between the taking of the two photographs, are eliminated by appropriate adjustment of the projection assemblies P, P' with respect to each other and with respect to the recording surface 24 by means of the outer gimbal system OG (FIGURES 3 to 5).

According to FIGURE 8 illustrating a prior art mode of operation for producing an orthomap, the two diapositives 16 and 16' are projected to create at the intersection point of the projection beams a real, optical stereoscopic model 143 of the terrain depicted in the overlapping portions of the diapositives. Provided that the two beams of light are either differently coloured by use of suitably coloured filters or differently polarized, the model 143 will appear three-dimensional when viewed through correspondingly coloured glasses or polarizers. In order to produce an orthomap, i.e., a representation of the terrain in which every detail is in its true horizontal location, an operator has to shift the recording surface 24 in a direction perpendicular to its plane so that the small area below the aperture 33 that is being exposed is always kept in contact with the stereoscopic model 143. For the production of the orthomap itself only the beam of light emanating from one of the projection assemblies P or P' is used.

According to this form of the invention, no real, optical, stereoscopic model is created. Instead, a virtual, optical, stereoscopic model is observed when viewing the image points 141, 141' through the ocular lenses 107 and 107' simultaneously. As the mounting plate 21 of the recording assembly R (FIGURE 1) is shifted along the Z-direction by rotation of the handwheel 23, the angle that is formed between the space rods 31 and 31' in a plane perpendicular to the Y-direction changes. As a result, the partial area 140 which is observed through the ocular lens 107 is moved across the diapositive 16 in a direction parallel to the X-direction and/or the partial area 140' which is observed through the ocular lens 107' is moved across the diapositive 16' also in a direction parallel to the X-direction, in such a manner that there will always be relative movement between the areas 140, 140'. Taking the special case that the space rod 31 extends along the Z-direction during the vertical shift of the recording surface 24, only the location of the partial area 140' relative to the diapositive 16' will change. This relative motion between the two partial areas 140 and 140' projected through the viewing systems V, V' will cause at the image points 141, 141' an apparent vertical shift of the virtual stereoscopic image of the terrain detail common to the partial areas 140 and 140'. Since the two measuring marks 101 and 101' are fixed relatively to the viewing systems V and V', respectively, the stereoscopic image of these marks will always appear at a constant height in the virtual stereoscopic model of the terrain. However, since the observer is accustomed to using the terrain as an optical datum, he will instead have the impression that the measuring mark is moved upwards and downwards relative to a fixed terrain. In any case, the apparent distance between the height of the measuring mark and the height of the terrain detail in the virtual model is varied by shifting the recording surface 24 along the Z-direction.

The relative height at which the stereoscopic image of the measuring marks will appear depends on the adustment of the measuring marks 101, 101' along the X-direction. This adjustment can be made by means of an adjusting screw 99 as shown in FIGURE 4a, so that the stereoscopic image of the measuring marks appears to be at the same height as the respective detail of the virtual stereoscopic model, when ever the portion of the recording surface 24 that is being exposed would contact the real stereoscopic model 143 in the prior art mode of operation. However, as indicated in FIGURE 7, a different coordination between the height of the recording surface 24 and the adjustment of the measuring marks 101, 102' is also possible. In order to produce a true orthomap, it is only necessary that the ratio between the vertical shift of the recording surface 24 due to the height difference between two terrain details and the corresponding horizontal distance is maintained.

THEORETICAL CONSIDERATIONS

In the above described prior art method, the recording surface is maintained in that plane in which the beams emanating from the projection assemblies P, P' intersect. For a given pair of diapositives, the vertical distance of this plane from the nodal points of the two projection lenses is determined by the horizontal distance between the nodal points themselves and it determines the scale of the orthomap that is produced on the recording surface. Due to the physical dimensions of the projection assemblies, the minimum horizontal distance between the nodal points is usually such that the minimum obtainable magnification of the orthomap compared to the dispositives is about 3:1.

According to the present construction, the plane of the recording surface is determined by the point of intersection of the space rods and, therefore, the scale of the orthomap is determined by the horizontal distance between the universal couplings (as 61 in FIGURE 5) pivoting these space rods. Since each space rod is offset from the nodal point of its projection assembly towards the other projection assembly (as will best be appreciated from FIGURE 1), the minimum horizontal distance between the universal couplings is essentially smaller than that between the nodal points, resulting in a minimum obtainable magnification of the orthomap of about 1.5:1.

Figure 9:
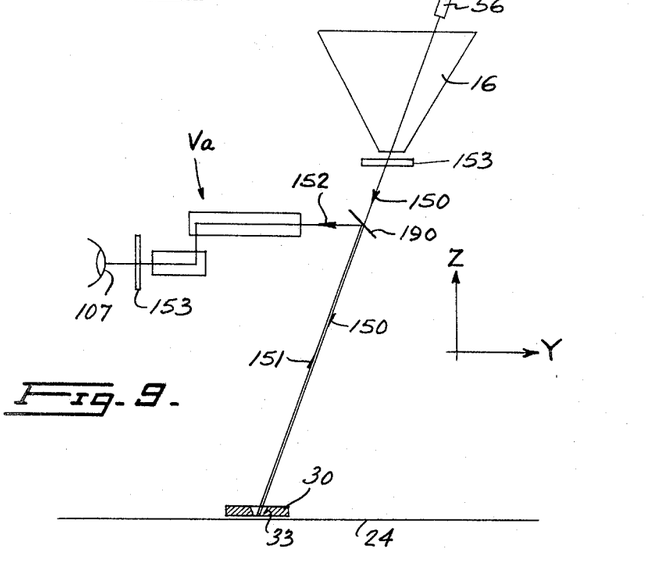
FIGURE 9 is a diagrammatic representation of a modification.

MODICATION (FIGURES 7 AND 9)

According to FIGURE 9, it is possible to use two partial-transparent mirrors 190 and place them in positions that are rotated 90° about their axes with respect to the positions shown in FIGURE 7. In this case a real, optical, stereoscopic model is produced at the surface 24, as in prior art devices, by the intersection of a beam 150 emanating from the projection assembly 16 and passing through the mirror 190, and a corresponding beam emanating from the projection assembly 16'. The latter beam is not separately shown in FIGURE 10, as it lies behind the beam 150.

Part of the light reflected from the beam 150 forms a return beam 151 that is reflected by the mirror 190 as a beam 152 to enter a viewing system Va that is the same as the viewing system as the viewing system V except that it need no longer contain a measuring mark, since the real optical model formed at the surface 24 is viewed steroscopically through the ocular lenses 107, 107', and the aperture 33 in the mask plate 30 indicates the height of the recording surface 24. Because the real stereoscopic model is now observed from above, i.e., in non-reversed orientation, the two pentagon prisms 104, 104' are replaced by triangular prisms. Also the accuracy requirements for the motions of the mirrors 190 are much less severe. As in the prior art, however, coloured filters or polarizers 153 are required both in the projection assemblies and the viewing systems. Moreover, it is to be noted that, depending on the properties of the partial-transparent mirrors 190, only a certain portion of each beam 150 is transmitted to the recording surface 24, at which a portion of this transmitted beam is absorbed and from which the remainder is reflected as the beam 151. The beam 151 is again divided at the mirror 190 and only the reflected portion is directed to the viewing system Va as the beam 152. In order to receive maximum brightness in the viewing system Va, the mirrors 190 should be made half-transparent, i.e., having a transmission to reflection rate of 1.

We claim:

1. A photogrammetric projection instrument comprising
    (a) a first and a second projection assembly for projecting a stereo-pair of photographs of an object, and a framework for supporting said first and second projection assemblies side-by-side;
    (b) a recording assembly having a recording surface, and means for shifting said recording surface in the direction towards said projection assemblies;
    (c) means for generating an optical stereoscopic model of said object, comprising a first viewing system V mounted on said framework and associated with said first projection assembly and a second viewing system mounted on said framework and associated with said second projection assembly;
    (d) a partial-transparent mirror disposed in the beam of light emanating from said first projection assembly, and first means coupled to said shifting means for orienting said partial-transparent mirror to direct a transmitted beam to said recording surface and a first reflected beam to said first viewing system; and
    (e) a further mirror disposed in the beam of light emanating from said second projection assembly, and second means coupled to said shifting means for orienting said further mirror to direct a second reflected beam to said second viewing system to form with said first reflected beam said optical model.

2. An instrument according to claim 1, wherein said mirrors are oriented at least partially to reflect the beams emanating from said first and second projection assemblies to said first and second viewing systems respectively, each of said viewing systems having a measuring mark provided in the respective reflected beam, said marks forming together a stereoscopic image for coinciding with said optical model.

3. An instrument according to claim 1, wherein said further mirror is also a partial-transparent mirror, and wherein said partial-transparent mirrors are oriented to tansmit the beams emanating from said first and second projection assemblies to form a real, optical, stereoscopic model at an area of intersection and to reflect beams of light emanating from said real stereoscopic model to said first and second viewing systems respectively.

4. An instrument according to claim 3, wherein both partial-transparent mirrors are substantially half-transparent.

5. An instrument according to claim 1, wherein said recording assembly comprises
    (a) a member defining a local area of said recording surface, and means for moving said member across said surface along an X-direction and a Y-direction perpendicular to said X-direction;
    (b) first means connecting said member to said first orienting means to rotate the beam emanating from said first projection assembly about a first axis extending in said Y-direction and a second axis extending substantially in said X-direction, and including means for rotating said partial-transparent mirror about a third axis perpendicular to said Y-direction at an angular speed that is half the rotational speed of said beam emanating from said first projection assembly about said second axis; and
    (c) second means connecting said member to said second orienting means to rotate the beam emanating from said second projection assembly about a fourth axis extending in said Y-direction and about a fifth axis extending substantially in said X-direction, and including means for rotating said further mirror about a sixth axis perpendicular to the Y-direction at the angular speed of rotation of said partial-transparent mirror.

6. An instrument according to claim 5, wherein each of said viewing systems comprises a Dove-prism having its optical axis extending in said Y-direction, and means for rotating each said Dove-prism about its optical axis at an angular speed that is half the angular speed of the rotation of the beam emanating from the respective projection assembly about said first and fourth axis respectively.

7. An instrument according to claim 5, wherein each of said viewing systems comprises a first portion rotatable about said first and fourth axis respectively, a second portion fixed to said framework, a pair of corresponding prisms, one of said prisms being disposed in said first portion and the other in said second portion, and means for interconnecting said first and second portions to maintain a face of said one prism in a parallel facing relationship to a face of said other prism.

8. An instrument according to claim 7, wherein said interconnecting means comprise a telescopic rod.

9. An instrument according to claim 7, wherein said mirrors are oriented at least partially to reflect the beams emanating from said projection assemblies to said viewing systems, and wherein one of said corresponding prisms is a triangular prism and the other is a pentagon prism.

10. An instrument according to claim 7, wherein said further mirror is also a partial-transparent mirror, wherein said mirrors are oriented to transmit the beams emanating from said projection assemblies to form a real, optical stereoscopic model at said recording surface and to reflect beams of light emanating from said model to said viewing systems, and wherein both of said corresponding prisms are triangular prisms.

11. An instrument according to claim 5, wherein each of said viweing systems comprises a measuring mark provided in the respective said reflected beam, said marks together forming a stereoscopic image, said first and second connecting means being such as, upon movement of said shifting means, to effect relative rotation between said beams emanating from said projection assemblies about an axis extending in said Y-direction, to cause relative motion between said optical model and said stereoscopic image formed by the measuring marks.

12. An instrument according to claim 11, including means for adjusting the measuring mark in at least one of said viewing systems along said X-direction.

13. An instrument according to claim 5, wherein each of said orienting means comprises a gimbal system, each said gimbal system including
 (a) a first gimbal ring fixed to said framework,
 (b) a second gimbal ring connected to said first gimbal ring for rotation about said first or fourth axis, respectively,
 (c) a pair of arms connected to said second gimbal ring for rotation about an axis perpendicular to said first or fourth axis, respectively, the respective one of said mirrors being pivoted in said pair of arms about said third or sixth axis, respectively, and
 (d) a control member pivoted to said second gimbal ring about a first point and connected to said respective mirror at a second point, the distance between said first and second points being substantially double the distance between the rotational axis of said second gimbal ring and said third or sixth axis, respectively.

14. An instrument according to claim 13, wherein said control member is a rod slidably connected to at least one of said points.

15. An instrument according to claim 13, wherein said control member comprises a convex cylindrical surface connected to said second gimbal ring and a concave cylindrical surface connected to said respective mirror and rolling on said convex surface, the radius of said concave surface being double the radius of said convex surface.

16. An instrument according to claim 6, wherein each of said orienting means comprises a gimbal system, each said gimbal system including
 (a) a first gimbal ring fixed to said framework,
 (b) a second gimbal ring connected to said first gimbal ring for rotation about said first or fourth axis, respectively,
 (c) a tube connected to said second gimbal ring and having an axis parallel to said Y-direction, the respective one of said Dove-prisms being mounted in said tube for rotation about said tube axis, and
 (d) a control member pivoted to said framework about a pivot point and connected to said Dove-prism, the distance between said pivot point and said tube axis being substantially double the distance between the rotational axis of said second gimbal ring and said tube axis.

17. An instrument according to claim 5, wherein said member defining said local area includes a mask plate having an aperture therein and a universal joint, and means for moving said mask plate across said recording surface, wherein said first connecting means includes a first telescopic rod connected to said universal joint and pivoted to said first projection assembly and means for connecting said first telescopic rod to said first orienting means, and wherein said second connection means includes a second telescopic rod connected to said universal joint and pivoted to said second projection assembly, and means for connecting said second telescopic rod to said second orienting means.

18. An instrument according to claim 17, wherein at least one of said telescopic rods is offset in said X-direction from the axis of the beam emanating from the associated said projection assembly.

19. An instrument according to claim 1, wherein each said projection assembly comprises a projector having a nodal point and an outer gimbal system mounting said projector on said framework for rotational adjustment of said projector about three axes perpendicular to each other and intersecting at said nodal point.

References Cited

UNITED STATES PATENTS 2,847,906   8/1958   Santoni ___________ 353—6 X

FOREIGN PATENTS 677,786   8/1952   Great Britain.

NORTON ANSHER, Primary Examiner

R. A. WINTERCORN, Assistant Examiner

U.S. Cl. X.R.

353—6, 7, 30; 355—52; 356—2, 12